UNITED STATES PATENT OFFICE.

OTTO OBERLÄNDER, OF LONDON, ENGLAND, ASSIGNOR TO GENERAL ELECTRIC COMPANY, A CORPORATION OF NEW YORK.

METAL-FILAMENT MANUFACTURE.

1,208,629. Specification of Letters Patent. Patented Dec. 12, 1916.

No Drawing. Application filed November 27, 1911. Serial No. 662,628.

*To all whom it may concern:*

Be it known that I, OTTO OBERLÄNDER, Ph. D., of No. 29 Queen street, London, E. C., England, consulting chemist, a subject of the King of Great Britain and Ireland, have invented certain new and useful Improvements in Metal-Filament Manufacture, of which the following is a specification.

My invention relates to the manufacture of coherent bodies and articles of refractory metal, particularly tungsten or molybdenum, and it comprises also a novel process for such manufacture. By this process not only can pure coherent bodies of either of the metals aforesaid be produced, but composite bodies consisting of alloys, compounds, or mixtures of these metals with one another or with other refractory substances can be made.

My invention presents the further advantages that the process does not involve the heat treatment for the removal of carbon characteristic of many methods of manufacture, and that the operations involved are few and simple and very easily carried out.

Other advantages will be apparent from the description of the process itself.

The invention is, in particular, applicable to the manufacture of bodies suitable for filaments or filament supports for incandescent lamps.

According to my process, haloid tungsten or molybdenum compounds are treated with a suitable liquid solvent and the resulting solution is evaporated, whereupon a residue is produced which is plastic and can be shaped as desired. This product is entirely suitable for the manufacture of rods, wires or the like by pressing or squirting it through a die and subjecting the bodies thus formed to the action of heat in hydrogen or other suitable gaseous atmosphere, or in a vacuum. The environment and manner of heating will in any particular case be determined by the materials employed and the consequent composition of the bodies when treated.

In the manufacture of tungsten bodies, for example, according to my invention, I start with a haloid of tungsten,—as the chlorid, bromid or iodid,—and I employ an organic reducing liquid such as methylated alcohol or ether. I prefer to use tungsten hexachlorid (which may be made by passing a current of chlorin over heated metal). I will describe one mode of procedure for the manufacture of tungsten filaments with tungsten hexa-chlorid as the starting material and with methylated ether (also termed ethyl ether) as the liquid solvent employed: the treatment of tungsten chlorid with methylated ether gives a yellow solution which changes to a dark blue color, and on evaporation of this solution or suspension to partial dryness there is obtained a dark blue residue which is plastic.

The details of the operation (which is equally applicable to molybdenum chlorid) are as follows:—Finely powered tungsten hexachlorid is added in small quantities to methylated ether, the latter being water-cooled to prevent the temperature from rising excessively. The quantity of materials used may be 10 grams or less of tungsten hexachlorid to 100 cubic centimeters of methylated ether. The solution or suspension resulting is then filtered so as to remove any insoluble matter and it is evaporated slowly until a paste of the desired consistency is produced while at the same time fumes of hydrochloric acid are evolved. The paste is then thoroughly worked and mixed in the usual manner and made up into slugs from which the raw filaments are pressed in a die-press. These raw filaments—which when dried are free from carbon and possibly consist of tungsten oxid and some tungsten chlorid as well—are then heated in a furnace supplied with hydrogen to a temperature of about 1500° C. to 2000° C., after which they become conductive and can be treated individually by electric current in a protective atmosphere so as to strengthen and consolidate the metal. This heating with current can be conducted in the usual manner, and may if desired be carried to a temperature far in excess of that at which the filaments are operated in the lamp in order to produce the most thorough sintering and shrinkage.

Composite bodies comprising a substance or substances additional to the metal of the compounds used as the starting material may be produced in the manner above described by simply mixing such substances in a finely divided or powdered state (or their compounds) with the plastic material when it is in the condition of a stiff paste. Composite bodies of tungsten and molybdenum may be produced in this way or by starting with a mixture of their compounds.

If it is for any reason desirable, a mixture of several different compounds of a single metal may be employed. Also, a mixture of several different solvents might be used.

While I have mentioned ethyl ether as a suitable solvent in carrying out the invention, I may use other organic solvents such as alcohol, acetone, chloroform, anilin, pyridin quinolin, nitrobenzol, and the like.

What I claim as new and desire to secure by Letters Patent of the United States, is:—

1. The method of producing a plastic mass for the manufacture of tungsten filaments which consists in treating a haloid of the tungsten with methylated ether and evaporating the resulting product to the desired consistency for subsequent operation.

2. The method of producing a plastic mass for the manufacture of tungsten bodies which consists in treating tungsten hexachlorid with methylated ether and evaporating the resulting product to a paste of suitable consistency.

3. A plastic material for the manufacture of tungsten bodies consisting of a pasty product of a halogen tungsten compound and methylated ether or its described equivalent.

In witness whereof I have hereunto set my hand this 17th day of November, 1911.

OTTO OBERLÄNDER.

Witnesses:
R. WESTACOTT,
H. D. JAMESON.